(12) United States Patent
Guerrieri et al.

(10) Patent No.: US 9,489,697 B1
(45) Date of Patent: Nov. 8, 2016

(54) SYSTEMS AND METHODS OF DETERMINING MICROROYALTIES

(71) Applicants: David A. Guerrieri, Sunnyvale, CA (US); Mario Antonio Guerrieri, Sunnyvale, CA (US)

(72) Inventors: David A. Guerrieri, Sunnyvale, CA (US); Mario Antonio Guerrieri, Sunnyvale, CA (US)

(73) Assignee: Microroyalties, LLC, Moffett Field, CA (US)

( * ) Notice: Subject to any disclaimer, the term of this patent is extended or adjusted under 35 U.S.C. 154(b) by 0 days.

(21) Appl. No.: 13/842,341

(22) Filed: Mar. 15, 2013

Related U.S. Application Data

(63) Continuation-in-part of application No. 13/050,832, filed on Mar. 17, 2011.

(60) Provisional application No. 61/314,726, filed on Mar. 17, 2010.

(51) Int. Cl.
*G07F 19/00* (2006.01)
*G06Q 40/00* (2012.01)

(52) U.S. Cl.
CPC .................................. *G06Q 40/10* (2013.01)

(58) Field of Classification Search
CPC .......... G06F 15/173; G06F 9/44; G06F 8/20; G06F 11/3457; G06Q 30/02
USPC ........... 709/205, 226; 705/7.13, 30; 717/124
See application file for complete search history.

(56) References Cited

U.S. PATENT DOCUMENTS

| | | | |
|---|---|---|---|
| 5,892,900 A | 4/1999 | Ginter et al. | |
| 6,389,538 B1 | 5/2002 | Gruse et al. | |
| 6,925,469 B2 | 8/2005 | Headings et al. | |
| 7,124,101 B1 | 10/2006 | Mikurak | |
| 7,188,069 B2 | 3/2007 | Hagelin | |
| 7,383,230 B2 | 6/2008 | Wolff | |
| 7,493,262 B2 | 2/2009 | Hagelin | |
| 7,523,045 B1 | 4/2009 | Walker et al. | |
| 7,587,412 B2 | 9/2009 | Weyl et al. | |
| 8,429,628 B2* | 4/2013 | Spurlin ..................... | G06F 8/53 717/144 |
| 2004/0089713 A1 | 5/2004 | Weaver | |
| 2005/0080744 A1 | 4/2005 | Ashida | |
| 2006/0129990 A1* | 6/2006 | Flanagan ............ | G06F 11/3457 717/124 |
| 2006/0229929 A1* | 10/2006 | Hughes ..................... | G06F 8/20 705/7.13 |
| 2007/0073723 A1 | 3/2007 | Ramer et al. | |
| 2007/0168354 A1 | 7/2007 | Ramer et al. | |
| 2007/0256077 A1* | 11/2007 | Zhong ..................... | G06F 9/505 718/104 |
| 2008/0065534 A1 | 3/2008 | Ooyama | |
| 2008/0082381 A1 | 4/2008 | Muller et al. | |
| 2008/0126107 A1 | 5/2008 | Callerio | |

(Continued)

OTHER PUBLICATIONS

Mason, RJ, "TMF: Microroyalties (TM) / Armchair Economists," http://boards.fool.com/microroyalties-tm-15381111.aspx?sort=whole. Accessed on Aug. 28, 2011.

(Continued)

*Primary Examiner* — Rokib Masud
(74) *Attorney, Agent, or Firm* — Carr & Ferrell LLP

(57) ABSTRACT

Systems and methods for determining a payment to a contributor are provided herein. Methods may include determining the contributor of a portion of software in a collaborative work; tracking the number of times the portion of software is used in a collaborative work; determining a weighting for each contributed portion of software; and calculating the proportional payment to each contributor based on the weighing and an income from the collaborative work.

20 Claims, 8 Drawing Sheets

(56) References Cited

U.S. PATENT DOCUMENTS

| | | | |
|---|---|---|---|
| 2008/0314974 A1 | 12/2008 | Hulst et al. | |
| 2008/0320436 A1* | 12/2008 | Hughes | 717/100 |
| 2009/0182573 A1 | 7/2009 | Lidestri | |
| 2010/0010968 A1 | 1/2010 | Redlich et al. | |
| 2012/0191528 A1* | 7/2012 | Bax | G06Q 30/02 705/14.41 |

OTHER PUBLICATIONS

Wikipedia Homepage. Retreived Sep. 23, 2013, from http://www.wikipedia.org/.

Non-Final Office Action, May 16, 2013, U.S. Appl. No. 13/050,832, filed Mar. 17, 2011.

Final Office Action, Dec. 27, 2013, U.S. Appl. No. 13/050,832, filed Mar. 17, 2011.

Advisory Action, Mar. 19, 2014, U.S. Appl. No. 13/050,832, filed Mar. 17, 2011.

"Webstorm: Collaborate with Webstorm". Brightidea. Retrieved Sep. 23, 2013, from http://www.brightidea.com/webstorm.bix.

Wikipedia Homepage. Retrieved Sep. 23, 2013, from http://www.wikipedia.org.

Non-Final Office Action, Jan. 21, 2015, U.S. Appl. No. 13/050,832, filed Mar. 17, 2011.

Final Office Action, Sep. 3, 2015, U.S. Appl. No. 13/050,832, filed Mar. 17, 2011.

Non-Final Office Action, Jul. 19, 2016, U.S. Appl. No. 13/050,832, filed Mar. 17, 2011.

* cited by examiner

2

SYSTEMS AND METHODS OF DETERMINING MICROROYALTIES

CROSS-REFERENCE TO RELATED APPLICATIONS

The present application is a continuation-in-part of U.S. patent application Ser. No. 13/050,832, filed Mar. 17, 2011, entitled "Systems and Methods for Determining Payments for Collaborative Innovation and Authorship", which claims priority to U.S. Provisional Application No. 61/314,726, filed Mar. 17, 2010, entitled "Royalty Payments for Collaborative Innovation and Authorship", both of which are hereby incorporated by reference herein in their entirety.

FIELD OF THE INVENTION

The present disclosure generally relates to payment determination, and more particularly, to determining payments for collaborative innovation or authorship.

BACKGROUND

Collaborative works may generally be described as works created by the individual contributions of more than one contributor wherein the individual contributions collectively form the collaborative work. One well-known example of a collaborative work of authorship is Wikipedia, which has approximately 18 million articles written collaboratively by volunteers around the world. Wikipedia is self-described as "the free encyclopedia that anyone can edit." Another well-known form of a collaborative work of authorship of innovation might be open-source software development. Several software developers who may or may not know each other personally contribute portions of source code that together make up a complex system that can provide significant value to users worldwide. Collaborative works may promote inclusivity of authorship and voluntary contributions by the contributors. Some of these collaborative works garner income through user fees, advertising revenue, etc.

SUMMARY OF THE INVENTION

According to various embodiments, a method is provided for determining a proportional payment to each contributor of a collaborative work, the method including receiving a contribution item, each contribution item provided by a contributor via a first computing device; executing instructions stored in memory for determining a weighting for each contribution item; and executing instructions stored in memory for calculating the proportional payment to each contributor based on the weighing and an income from the collaborative work. The proportional payment may be calculated based on a product of the weighting and the income from the collaborative work. The method may further include receiving a judge rating for each contribution item, each judge rating provided by a judge via a second computing device. The weighting may be based on the judge rating of the contribution item divided by the judge rating of the collaborative work. The method may further include tracking in a database the number of views of the collaborative work and the number of views of each contribution item therein, wherein the weighting is based on the number of views of the contribution item divided by the number of views of the collaborative work. The method may further include tracking in a database the number of views of each contribution item, wherein the weighting is based on the judge rating of the contribution item and the number of views of the contribution item. The income may be one or more of subscription income, advertising income, license fees, and pay-per-view fees. The contribution item may be one or more of a sentence, a paragraph, a page of text, a line of computer code, a computer sub-routine, an icon, an electrical or electronic component, a video, an audio, a hyperlink, an RSS feed, an image, an idea and a concept, and the like. The method may further include receiving from a commissioner one or more of conflict of interest rules, best practices rules, selection of at least a portion of the collaborative work to assign to an editor, and selection of at least a portion of the collaborative work to assign to a judge for rating. The commissioner may select from a system-provided list of the best practices recorded from previous commissioners of similar or different previous works in order to assist him in his selection of a framework of rules and best practices for his collaborative work. The method may also include receiving from an editor one or more of a determination of which of the contribution items to retain in a collaborative work, revisions to one or more contribution items, wherein the revisions are performed before a judge rates the contribution items. The method may further comprise executing instructions stored in memory for calculating a total payment due to the respective contributor based on the sum of the proportional payments for each of the contribution items of the contributor. The collaborative work may comprise a design work including one or more of a system design, a process design, a hardware design, a software design and implementation, and wherein the contribution items may comprise one or more of icons, components, circuits, and sub-circuits provided by contributors that collectively form the electronic circuit. The method may further comprise executing instructions in memory for parsing a collaborative work to separate contributions of the contributors of a collaborative work into a plurality of contribution items, wherein the contribution items comprises one or more of a sentence, a paragraph, a page of text, a line of computer code, a computer sub-routine, an icon, an electrical or electronic component, a video, an audio, a hyperlink, an RSS feed, an image, an idea and a concept, and the like.

According to some embodiments, a system is provided that may include a memory for storing executable instructions for determining a proportional payment to each contributor of a collaborative work; a processor configured to execute the instructions stored in the memory to perform a method, the method including receiving a contribution item, each contribution item provided by a contributor via a first computing device; determining a weighting for each contribution item; and calculating the proportional payment to each contributor based on the weighing and an income from the collaborative work. For the system, the proportional payment may be calculated based on a product of the weighting and the income from the collaborative work. The method of the system may further include receiving a judge rating for each contribution item, each judge rating provided by a judge via a second computing device. The weighting may be based on the judge rating of the contribution item divided by the judge rating of the collaborative work. The method may further comprise tracking in a database the number of views of the collaborative work and the number of views of each contribution item therein, wherein the weighting is based on the number of views of the contribution item divided by the number of views of the collaborative work. For the system, the income may be one or more of subscription income, advertising income, license fees, and pay-per-view fees. The contribution item may comprise one or more of a sentence, a paragraph, a page of text, a line of computer code, a computer sub-routine, an icon, an electrical or electronic component, a video, an audio, a hyperlink, an RSS feed, an image, an idea and a concept, and the like. According to another aspect, the method for the system further comprises receiving from a commissioner one or more of conflict of interest rules, best practices rules, selection of at least a portion of the collaborative work to assign to an editor, and selection of at least a portion of the collaborative work to assign to a judge for rating. The method of the system may also include receiving from an editor one or more of a determination of which of the contribution items to retain in a collaborative work, revisions to one or more contribution items, wherein the revisions are performed before a judge rates the contribution items. The method of the system may also include executing instructions in memory for parsing a collaborative work to separate contributions of the contributors of a collaborative work into a plurality of contribution items, wherein the contribution items comprises one or more of a sentence, a paragraph, a page of text, a line of computer code, a computer sub-routine, an icon, an electrical or electronic component, a video, an audio, a hyperlink, an RSS feed, an image, an idea and a concept, and the like.

According to other embodiments, a non-transitory computer readable storage medium may be provided having a program embodied thereon, the program executable by a processor in a computing device to perform a method for determining a proportional payment to each contributor of a collaborative work, the method comprising receiving a contribution item, each contribution item provided by a contributor via a first computing device; receiving a judge rating for each contribution item, each judge rating provided by a judge via a second computing device; and executing instructions stored in memory for calculating the proportional payment to each contributor based on the judge rating and an income from the collaborative work.

According to other embodiments, a system is provided that may include a memory for storing executable instructions for determining a proportional payment to each contributor of a collaborative work; a processor configured to execute the instructions stored in the memory to perform a method, the method including identifying the author or intellectual property rights holder, also known as a contributor, of a portion of software code or other creative work; tracking the number of times the portion of software code or other creative work is executed or used or read; determining a weighting for the portion of software code, sentence, paragraph, CAD design element, page, or otherwise defined "contribution item"; and calculating the proportional payment to each contributor based on the weighting and an income of the overall software or creative work. The determining may be performed using a computing device, identifying comments associated with software code or creative work, querying a database, manual inspection of the software code, interpreted code, or pseudo code, or other similar methods.

DETAILED DESCRIPTION OF THE INVENTION

Figure 1:
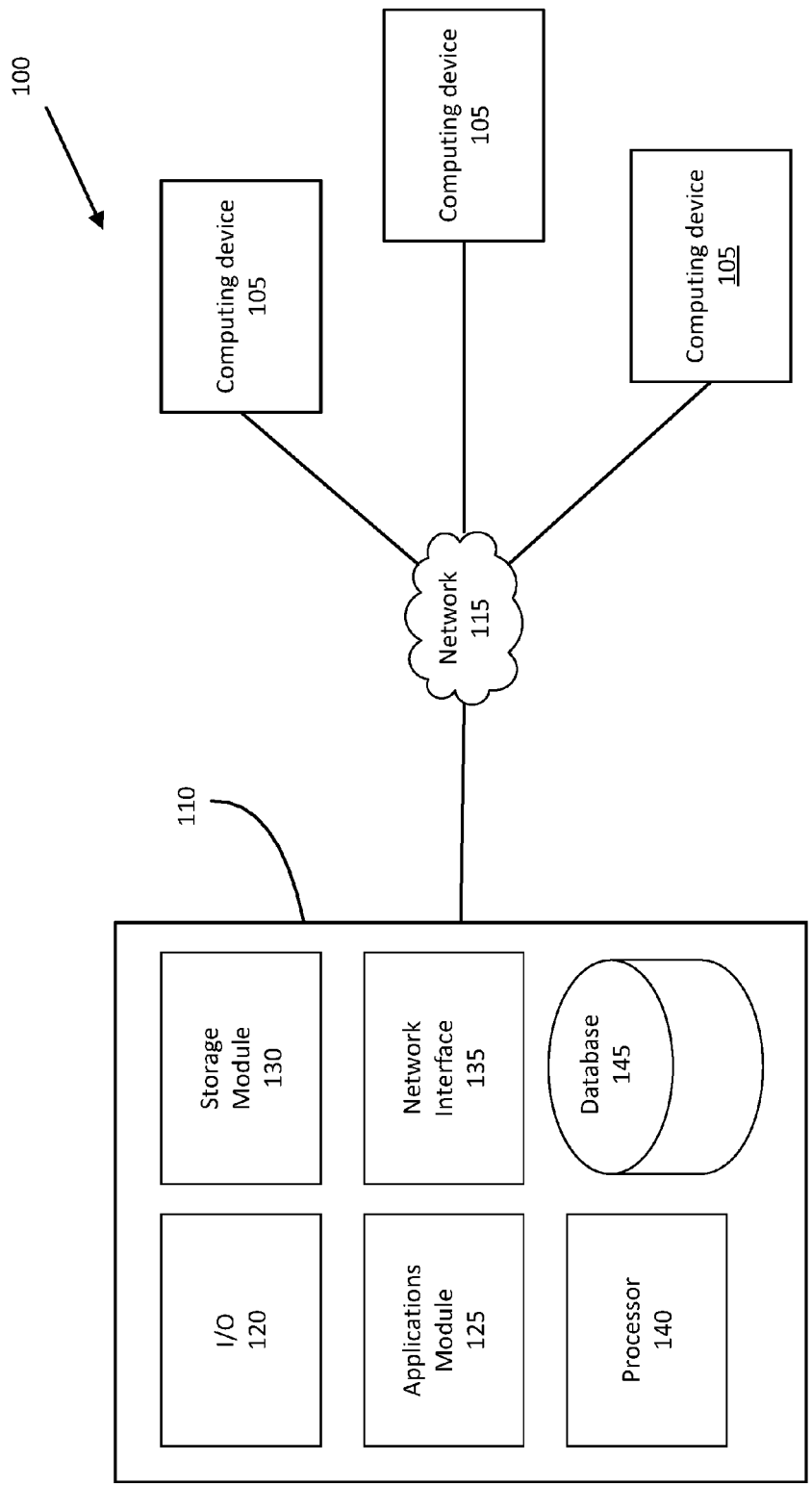
FIG. 1 is a block diagram of an exemplary architecture of a system for practicing aspects of the present technology.

Before explaining the presently disclosed and claimed inventive concept(s) in detail by way of exemplary embodiments, drawings, and appended claims, it is to be understood that the present disclosure is not limited in its application to the details of construction and the arrangement of the components set forth in the following description or illustrated in the drawings. The present disclosure is capable of other embodiments or of being practiced or carried out in various ways. As such, the language used herein is intended to be given the broadest possible scope and meaning; and the embodiments are meant to be exemplary—not exhaustive. It is to be understood that the phraseology and terminology employed herein is for the purpose of description and should not be regarded as limiting. Unless otherwise required by context, singular terms may include pluralities and plural terms may include the singular.

It is to be understood that the term "contribution item" or "contribution items" as used herein generally refers to works of authorship or innovation provided by a contributor. The contribution items may collectively form a collaborative work or design. Exemplary contribution items may include a sentence, a paragraph, or a page of text, a line of computer code, a computer sub-routine, an icon, an electrical/electronic component, system inputs, a video, an audio, a hyperlink, an RSS feed, an image, an idea and a concept, and the like. A contributor may be an author, a holder of the intellectual property right in the contribution item, or other similar person.

It is to be understood that the term "view" as used herein generally refers to the use of the contribution item in any way. Exemplary views may include a person reading or displaying on a display or printed page any sort of contribution item listed above and/or may include a machine reading and executing software or other type of contribution item suitable for reading or executing by machine. In either case, the number of views may be counted and used for the calculation of weighting for proportional payment based on such use.

It is to be understood that the term "commissioner" as used herein generally refers to the person, organization, government agency, or any other entity, that commissions the formation of a collaborative work. The commissioner may establish any rules, e.g., conflict of interest rules and/or best practice rules, applicable to any aspect of the collaborative work. The commissioner may determine who may act as an editor, a judge, a contributor, etc. The commissioner may fund, or otherwise pay for the formation and/or hosting of the collaborative work. The commissioner may control, oversee, and operate, etc., the system according to various embodiments. The commissioner may commission more than one collaborative work. The commissioner may compile a list of best practices and supply the list of best practices that are applicable to a particular collaborative work.

It is to be understood that the term "judge" or "judges" as used herein generally refers to a person, organization, or entity, reviewing a contribution item to determine one or more of the accuracy, relevance, importance of the contribution item. The judge may be considered within the relevant field to be an expert in the field. A judge may review a contribution item and assign or determine a judge rating to the contribution item. A judge may correct spelling, grammatical errors, etc., in a contribution item. A judge may add, delete, or otherwise rewrite a contribution item. A judge may be selected by a commissioner.

It is to be understood that the term "editor" or "editors" as used herein generally refers to a person, organization, or entity, reviewing a contribution item. An editor may determine which contribution items are to be included in the collaborative work based, for example, on the judge rating of the contribution item. An editor may correct spelling, grammatical errors, etc., in a contribution item. An editor may add, delete, or otherwise rewrite a contribution item to, for example, correct errors in the contribution item. An editor may review a contribution item before or after the judge has reviewed the contribution item and determined the judge rating of the contribution item. The roles of editor and judge may be performed by separate persons or entities or a single person or entity.

It is to be understood that the commissioner may also variously perform one or more of the roles of the judge and the editor. The commissioner may review and/or edit the contribution items forming the collaborative work. The commissioner may determine, assign, or otherwise associate the judge rating with the contribution items. The commissioner may determine who may act in the role of an editor and a judge.

Generally, the systems and methods provided herein may provide a mechanism for monetization and/or payment for contribution items contributed to a collaborative work. A fair and predictable system of compensation/remuneration to contributors providing contribution items may be provided, as well as to editors and/or judges reviewing the contribution items. Rules may be clearly defined in advance to reduce the chances of disagreements between parties, which may accelerate the pace of innovation and improve productivity. One exemplary rule may be the identification of contribution items provided by contributors wherein the contributors retain their intellectual property rights to their contribution items.

Generally, collaborative works may be edited by anyone. Contributions by highly credentialed experts may play on the same playing field with novices, i.e., contributions by experts are generally considered to have the same level of importance, accuracy, and authority as contributions by those with little or even no experience or expertise in the relevant field. In this circumstance, the overall value of the collaborative work may be minimized or even eliminated completely such that viewers or users of the collaborative work might become reluctant to rely on the content in the collaborative work perceived as not an authoritative work. Advertisers may be less likely to pay to advertise their products or services with the collaborative work, thus reducing the revenue generated by the collaborative work.

Traditional collaborative work methodologies may create barriers to, or otherwise discourage contributions by authors. For instance, the intellectual property rights of the contributors can be released to the owner of the collaborative work. The lack of intellectual property rights may result in expert contributors with many years of relevant experience losing the fruits of their contributions. Further, the absence of pre-established rules and/or best practice guidelines protecting an author may dissuade the author from participating in a collaborative work, e.g., the author may not feel comfortable sharing their thoughts due to fear of not being remunerated fairly or concern over having their ideas taken by others.

The collaborative work may be topical, e.g., relating to a particular subject area. The systems and method may be utilized for the creation of collaborative works covering a variety of topics or intended results. The collaborative work may be intended to be an authoritative work, i.e., one generally considered to carry authority within the applicable community. The collaborative work may be, for instance, a collection of contribution items relating to the field of piloting. Those contribution items may be provided by contributors having useful experience in the field to share with more novice pilots. That collaborative work can then serve as a trusted and relied upon source of competent, accurate information in the field of piloting, i.e., an authoritative work.

The systems and methods may be utilized for the creation of a collaborative work of content development and authorship. Such exemplary works may include books, magazines, newspaper articles, training courseware, technical and scientific works, works of art or fiction, and the like. For content development and authorship works, the contribution items from contributors may be a text sentence, a text paragraph, a text page on the topic of the collaborative work. The individual contribution items may collectively form the collaborative work.

The systems and methods may be utilized for the creation of a design work. The collaborative design work may be the creation of a computer program, for example, wherein contribution items may take the form of computer code or sub-routines. The collaborative design work may be the design of an electronic circuit or system wherein contribution items may take the form icons, components, circuits, and/or sub-circuits, provided by contributors that collectively form the electronic circuit. Exemplary design works include a system design, a process design, a hardware design, a software design and implementation, as well as a variety of other engineering disciplines.

Various embodiments may be utilized in the monetization of the collaborative work. The collaborative work may be monetized or otherwise generate revenue using a variety of considerations. The considerations may include requiring payment for distribution of the collaborative work to "viewers" of the work, i.e., the collaborative work may be made available online using a web server wherein individuals/organizations pay a fee to view the collaborative work. The fees may be in the form of one or more of a one-time fee for access to the collaborative work, a pay-per-view fee, a periodical subscription fee, a license fee, or other suitable fees. The collaborative work may be monetized or otherwise generate revenue by charging a fee to advertisers for the rights to provide ads in conjunction with the presentation of the collaborative work. According to some embodiments, tracking and/or recording is provided of a viewer's selection of an ad displayed in conjunction with the collaborative work or individual contribution item, i.e., click-through technology to track viewer clicking of ads in a web browser). Payment for access or distribution rights may be calculated by some embodiments using a formula based on one or more of the number of views, the judge's rating, which formula may be based on the views and ratings for the collaborative work as a whole, e.g., proportion of the whole.

The collaborative work may be monetized or otherwise generate revenue based on intellectual property rights. The collaborative work formed may be protected under copyright law, contain trademarks, or may even include patentable material. In this aspect, the commissioner may limit the distribution of the collaborative work based on the intellectual property rights.

The system and mechanism may provide the managing of conflicts. The system may make information available that might expose an actual or perceived conflict of interest. As would be understood in the art, a conflict of interest may exist when a contributor provides a contribution item and the assigned reviewer, e.g., judge, editor, might be associated to the contributor in some way as an employee, relative, etc. Various embodiments may be adapted to store, analyze, and/or make available information that would expose such conflicts and, based on that information, assign a different reviewer to the subject contribution item.

Best practice guidelines and other information may be provided to or developed by the commissioner for various aspects, e.g., for the selection of contributors, editors, and/or judges. Exemplary best practice guidelines may include methods and systems to identify conflicts of interest. A mechanism may be provided to keep the contributor's names private from judges, editors, and/or viewers.

Parsing to determine contribution items may be provided. Calculation of the value of, and payment for, a contribution items may also be provided. The collaborative work may be formed by a plurality of contribution items provided by contributors. Instructions may be executed in memory to parse the collaborative work into contribution items. The contribution items may be parsed depending on the contributor providing the contribution items. That is, the present systems and methods may identify, track, or otherwise be adapted to determine and record which contributor contributed which contribution item. Various embodiments may suggest the granularity or size of the parsed contribution items based on, for example, the nature and/or type of collaborative work. A contribution item may be, for instance, each sentence or paragraph of a collaborative work. For a design work, each icon or design element may be parsed to be a contribution item. Each line of code or sub-routine may be a contribution item for a software program collaborative work. Contribution items may be identified as being provided by a particular contributor. A list of contribution items, the date and time of contribution, and/or identification of the contributor that provided the contribution item may be maintained.

The value of the contribution items may be calculated based on any combination of a set of predefined rules and considerations. Exemplary rules may include the level of expertise of the contributor, the accuracy and completeness of the contribution item, the contribution's relative importance to the collaborative work, etc. The value of contribution items may be based on the number of views the contribution item receives, separately or in combination with one or more others considerations including the number of views for the collaborative work, judge's rating, etc. The contribution items may also be valued based on the income the collaborative work receives or otherwise generates.

The value of the contribution items may be based on input from one or more judges, i.e., based on a judge rating assigned or otherwise associated with the contribution item. A list of judges and the qualifications of the judges may be maintained. Using such information, the appropriate judges may be selected to review a contribution item based on the accuracy and/or relevance of the contribution item. For example, a judge who is highly skilled or qualified in the field of piloting may be selected to review one or more contribution items collected to form a collaborative work in said field. Once a contributor has provided a predetermined number of contribution items receiving a judge rating at or above a predefined level, the contributor may be identified as an expert in the relevant field and then be suggested to serve the role of judge/editor. Based on the information relating to the judges, the system and method may maintain the judge's role and the contribution items they are allowed to rate. Some embodiments may provide for a list of the judges and the judge ratings the judge has provided, as well as the date and time.

A method and system may be provided for the judge to review and/or edit the contribution items. The method and system may be implemented online, e.g., as a web server, wherein the judge accesses the contribution items and/or collaborative work via a series of web pages to thereby review, edit, and/or assign a judge rating to the contribution items. A mechanism may be provided for the judge to add and visualize the judge ratings for the contribution items. For example, a mechanism to use colors and/or a legend to depict the judge rating of the contribution items may be provided. Various embodiments may provide a mechanism for the contributors to be informed of the judges ratings assigned to their contribution items. Some embodiments may further provide a mechanism for viewers to provide a rating (e.g., a judge rating) for the contribution items, e.g., the viewers may be provided with a mechanism to give the contribution item a thumbs-up or a thumbs-down rating.

A system and method may variously be provided to assign editors to select which contribution items to include in the collaborative work. In one example, once a judge has reviewed the contribution item and assigned a judge rating (e.g., a score of 1 to 100 or a standard deviation) to the contribution item, an editor may be given the role of determining which contribution items are to be included in the collaborative work. The editor may determine which contribution items will be included in the collaborative work the contribution item has been rated. A determination may be made of whether the contribution item will be included in the collaborative work based on the judge rating, i.e., the contribution item will be removed if the judge rating is below a predetermined level. The role of editor and judge may be assigned to the same person or entity.

In some embodiments, payment to the editors and/or judges may be calculated. In one example, the editors and/or judges may be paid based on a formula, e.g., based on the number of contribution items reviewed, based on the word count of the contribution items reviewed, based on the amount of time required to review the contribution items, etc. The editors and/or judges may be paid based on a percentage of the collaborative work income. Costs associated with forming the collaborative work, e.g., the overhead costs, may be determined in some embodiments. The systems may then determine the collaborative work income by subtracting the overhead costs from the document income and then pay the editors and/or judges a percentage of the collaborative work income.

In some embodiments, the present technology may determine a weighting or weighted value for the contribution items and then base payment to the contributor, in part, on the weighting. In one example, the weighting may be calculated by number of views of the contribution item divided by the total number of views for the collaborative work. The payment may be calculated as the product of the weighting and the collaborative work income. The weighting may be based on one or more of the number of views, judge rating, proportionally, for each contribution item and for the collaborative work as a whole. In the case of a collaborative design work, the present technology may keep track of, for example, the number of times a line of computer code or a computer sub-routine is executed, which can correlate to the number of views for weighting purposes. Various aspects provide for the transparency of the formula used, regardless of which formula is used, to determine payments to contributors.

In various embodiments, payment for a contribution item may be calculated by: 1) calculating the collaborative work's total score by adding together all the judges ratings for contribution items forming the collaborative work, e.g., the sum of contribution item scores; 2) calculating each contribution item's weight value by dividing its judge rating into the work's total score; 3) calculating the payment (e.g., royalties) due to the contributor by adding the weight value of each of the contributor's contribution items (may be referred to as the weight sum); and 4) calculate the payment to the contributor by multiplying the weight sum by the collaborative work income. In some embodiment, the present methodology may calculate the payment to the contributors proportional to the sum of the value of the contribution items.

In certain embodiments, the present technology may maintain a list of contributors, their contribution items, and/or their preferred method of payment. As would generally be understood, the present technology may provide a mechanism to read and/or sign an agreement to license distribution of their contribution items according to an agreed to fee structure and/or predefined rules. The present technology may also provide a mechanism for the contributor to view the contributor's income for each contribution item and/or collaborative work, view the operating expenses (e.g., overhead costs) for the collaborative work, as well as other information relating to past, current, and/or future payments. These and other function and implementation details regarding the systems and methods of the presently described and claimed inventive concepts will be described in greater detail below with reference to the FIGS. 1-7.

FIG. 1 illustrates an exemplary architecture 100 of a system which may be adapted to practice aspects of the present disclosure. That is, the exemplary architecture illustrated in FIG. 1 includes hardware, software, and/or combinations thereof, adapted to implement certain aspects of the presently disclosed and claimed inventive concept(s). The exemplary architecture is provided by way of example only and is not intended to be limiting. That is, changes and variations to the exemplary architecture illustrated in FIG. 1 are considered within the scope of the present disclosure.

The system 100 illustrated in FIG. 1 includes one or more computing devices 105 (three being shown in FIG. 1 by way of example) coupled to a processing system 110 via a network 115. The system is not limited to three computing devices, other numbers of devices may be used. Although FIG. 1 shows one processing system 110 communicating through the network 115 with three computing devices 105, it is to be understood that the system 100 can include more than one processing system 110 (e.g., more than one server) communicating with more or less computing devices 105.

Generally, the computing device 105 may be associated with one or more users, e.g., one or more of a contributor, a judge, and an editor user. The computing device 105 may be adapted to permit the user to communicate, or otherwise interface with the processing system 110, via the network 115. The computing device 105 can include component(s), logic instructions, and/or combinations thereof, adapted to permit the user to interface with the processing system 110 to, for example, 1) provide one or more contribution items to the processing system 110, 2) judge and/or edit one or more contribution items, 3) determine, associate, or otherwise record a judge rating or score for the one or more contribution items, and/or 4) provide the edited or judged contribution item and the judge rating or score to the processing system 110 via the network 115.

The computing device 105 may be adapted to permit the editor or judge to interface with the processing system 110 using, for example, a web browser, to access the contribution item over the network 115. The contribution item may be stored on the processing system 110 rather than being downloaded to the computing device 105. The judge or editor may access the contribution item and judge or edit the contribution item through and using, for example, a series of web pages accessible via the web browser operating on the computing device 105. The computing device 105 may include components, logic instructions, and/or combinations thereof adapted to record, associate, or otherwise provide a judge rating or score and an edited contribution item to the processing system 110.

In yet another aspect, the computing device 105 can be adapted to permit the judge and/or editor to: interface with the processing system 110 via the network 115 to download the contribution item to the computing device 105; judge or edit the contribution item using the computing device 105; record or otherwise associate a judge rating or score with the contribution item; and upload or otherwise provide the judged/edited contribution item and the judge rating or score to the processing system 110.

The computing device 105 may include any computerized system that can implement a web browser application or other suitable applications adapted to request and provide information to and from the processing system 110 via the network 115. Exemplary systems adapted to implement the computing device 105 include, but are not limited to, a general purpose computing system, a personal computer, a laptop computer, a netbook, a personal digital assistant (PDA), a smart phone, an e-reader, and/or equivalents thereof. Exemplary software applications included on the computing device 105 include a web browser application, a word processor application, a time keeping/tracking application, a communication application, as well as a wide variety of applications understood by one having ordinary skill in the art.

Broadly, the network 115 may be adapted to permit the one or more computing devices 105 to communicate with the processing system 110, and vice versa. The network 115 can be implemented via the World Wide Web (WWW), a wide area network (WAN), a local area network (LAN), the Internet, a wireless network, a cellular telephone network, and/or equivalents or combinations thereof.

The processing system 110 may include component(s), logic instructions, and/or combinations thereof, adapted to implement at least a portion of the currently described and claimed inventive concept(s). The processing system 110 may include instructions stored on non-transitory computer readable medium that when executed causes the processing system to implement the present technology.

As shown in FIG. 1, the processing system 110 may include an input/output (I/O) module 120, an applications module 125, a storage module 130, a network interface module 135, a processor 140, and one or more databases 145. The I/O module 120 includes hardware, logic, and/or combinations thereof that may permit the commissioner or an administrator to interface, operate, or otherwise control the processing system 110. Exemplary components included as a part of the I/O module 120 may include a keyboard, a mouse, a monitor, a pointing device, a printer, a scanner, and equivalents and/or combinations thereof.

The applications module 125 may include one or more of programs, applications, logic instructions, and computer executable code adapted to operate the processing system 110 as well as to carry out at least a portion of the currently described and claimed inventive concept(s). The storage module 130 may store, for example, the programs and/or applications, operating protocols, and the like, as well as a variety of other processing system 110 parameters, as would be understood in the art. The network interface module 135 may be adapted, or otherwise configured to enable the processing system 110 to communicate via the network 115. The processor 140 may include components, logic instructions, and/or combinations thereof adapted to generally operate the processor system 110.

The database 145 may include, for example, information relating to one or more of contribution items, judges, editors, contributors, collaborative works, etc. Although shown as a single database, the database 145 can be implemented as a plurality of internal or external databases, e.g., a relational database, object database, and the like.

It is to be understood that the description provided above regarding the particularities of the exemplary architecture implementing the processing system 110 is provided by way of example and is not to be considered limiting. The processing system 110 may be implemented as described above or with a variety of modifications and/or changes to the architecture without departing from the particular functions described herein. For example, the processing system 110 may be implemented as a stand-alone server, as a web server, as a distributed server system, as an application server, in combination with a database server, etc. When the processing system 110 is implemented as a webserver, the processing system 110 may communicate with the computing device 105, via the network 115, through a series of web pages. The processing system 110 may be implemented as a single web server or as a distributed processing system including a plurality of server(s) coupled to one or more databases, either locally or remotely.

Figure 2:
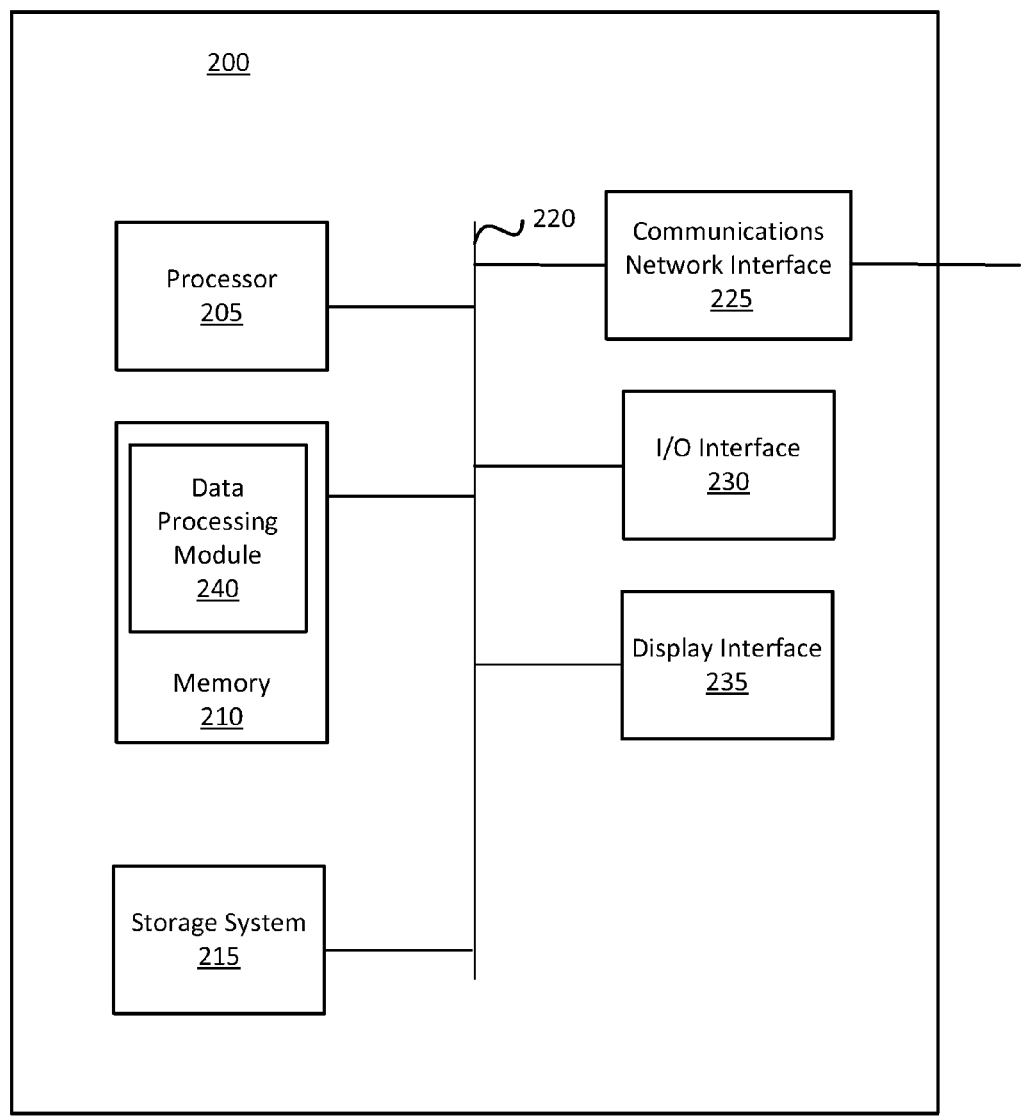
FIG. 2 is a block diagram of an exemplary system for practicing various embodiments.

Referring now to FIG. 2, shown therein is a block diagram of an exemplary system 200. System 200 may be used to implement computing device 105 of FIG. 1. The system 200 may include one or more processors 205 and memory 210. The memory 210 may store, in part, instructions and data for execution by the processor 205. The memory 210 may store executable code when in operation. The memory 210 may include a data processing module 240 for processing data. The system 200 may further include a storage system 215, communication network interface 225, input and output (I/O) interface(s) 230, and display interface 235. The components shown in FIG. 2 are depicted as being communicatively coupled via a bus 220. The components may be communicatively coupled via one or more data transport means. The processor 205 and memory 210 may be communicatively coupled via a local microprocessor bus, and the storage system 215 and display interface 235 may be communicatively coupled via one or more input/output (I/O) buses. The communications network interface 225 may communicate with other digital devices (not shown) via a communications medium.

The storage system 215 may include a mass storage device and portable storage medium drive(s). The mass storage device may be implemented with a magnetic disk drive or an optical disk drive, which may be a non-volatile storage device for storing data and instructions for use by the processor 205. The mass storage device can store system software for implementing embodiments according to the present technology for purposes of loading that software into the memory 210. Some examples of the memory 210 may include RAM and ROM. A portable storage device, as part of the storage system 215, may operate in conjunction with a portable non-volatile storage medium, such as a floppy disk, compact disk or digital video disc (DVD), to input and output data and code to and from the system 200 of FIG. 2. System software for implementing various embodiments may be stored on such a portable medium and input to the system 200 via the portable storage device. The memory and storage system of the system 200 may include a non-transitory computer-readable storage medium having stored thereon instructions executable by a processor to perform, at least partially, a method for determining a proportional payment to each contributor of a collaborative work. The instructions may include software used to implement modules discussed herein, and other modules.

I/O interfaces 230 may provide a portion of a user interface, receive audio input, and provide audio output. The I/O interfaces 230 may include an alpha-numeric keypad, such as a keyboard, for inputting alpha-numeric and other information, or a pointing device, such as a mouse, trackball, stylus, or cursor direction keys. The display interface 235 may include a liquid crystal display (LCD) or other suitable display device. The display interface 235 may receive textual and graphical information, and process the information for output to the display interface 235.

Figure 3:
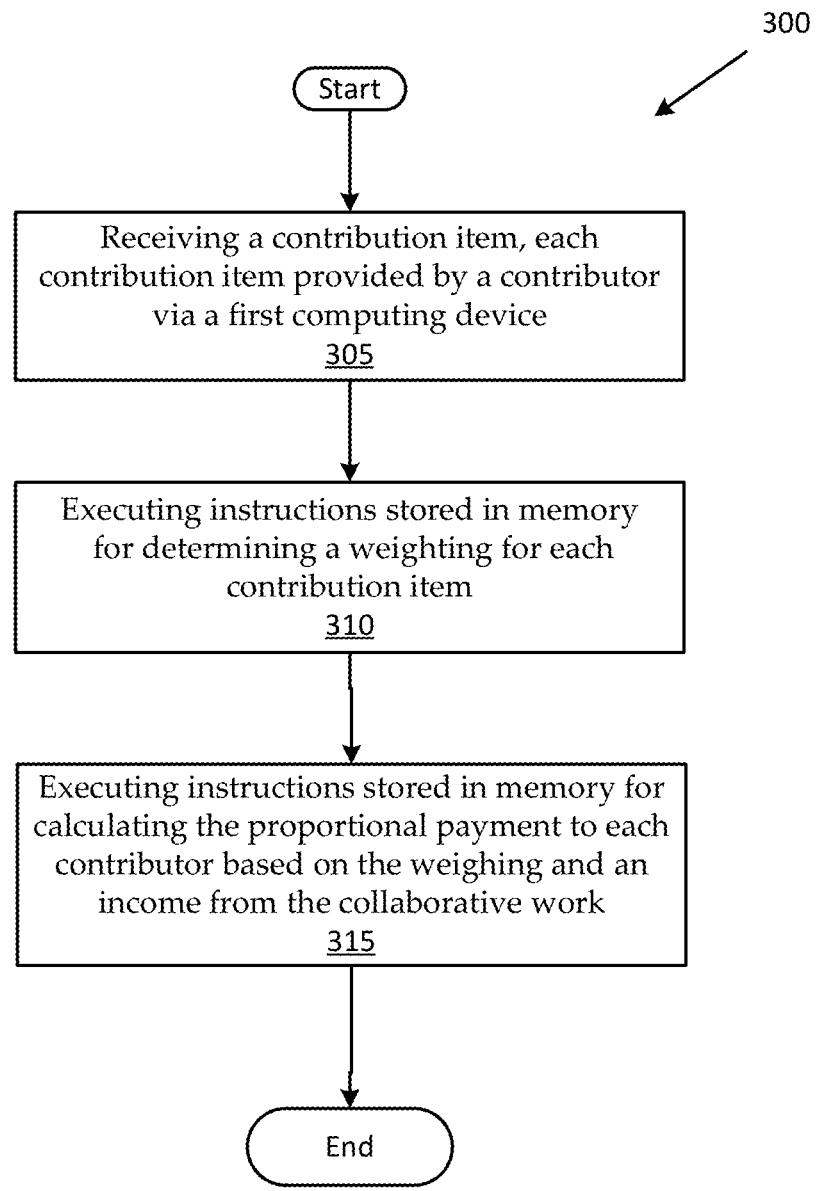
FIG. 3 is an exemplary flow diagram of a method for determining a payment to a contributor.

FIG. 3 is an exemplary flow diagram of a method 300 for determining a payment to a contributor. The payment may be a proportional payment. Generally, the steps of the method 300 may be performed by the processing system 110 and/or the system 200. One of ordinary skill in the art will appreciate that the processing system 110 can be implemented as a plurality of web servers, i.e., the steps of the method 300 may also occur on one or more web servers, one or more presentation servers, or across a distributed computing system such as a cloud computing system, and the like.

The method 300 may include the step 305 of receiving a contribution item, each contribution item provided by a contributor via a first computing device. The contribution item may be one or more of a sentence, a paragraph, a page of text, a line of computer code, a computer sub-routine, an icon, an electrical or electronic component, a video, an audio, a hyperlink, an RSS feed, an image, an idea and a concept, and the like. In some embodiments, the processing system 110 may receive the contribution item via the network 115 from contributors using the computing device 105. The present technology may further provide a mechanism to record the identification of the contributor providing the contribution item, the date and time the contribution item was received, etc. The processing system 110 may provide for storage of the contribution item, as well as the associated information, in, for example, the database 145 and/or the storage module 130.

The processing system 110 and/or the system 200 may be configured for parsing a collaborative work to separate contributions of the contributors of a collaborative work into a plurality of contribution items, wherein the contribution items comprises one or more of a sentence, a paragraph, a page of text, a line of computer code, a computer sub-routine, an icon, an electrical or electronic component, a video, an audio, a hyperlink, an RSS feed, an image, an idea and a concept, and the like.

The method 300 may further include the step 310 of executing instructions stored in memory for determining a weighting for each contribution item. According to various embodiments, the weighting may be based on one or more of a judge rating and the number of views for a contribution item. In some embodiments, the processing system 110 and/or the system 200 may determine the judge to review the contribution item, provide the contribution item to the judge for review, receive and/or record the judge rating from the judge reviewing the contribution item, and associate the judge rating with the contribution item. As would be appreciated in the art, the processing system 110 may further include logic to store the judge rating for the contribution item.

Some embodiments include tracking in a database the number of views of the collaborative work and the number of views of each contribution item therein. The weighting may then be based, at least in part, on the number of views of the contribution item divided by the number of views of the collaborative work.

The method 300 may further include the step 315 of executing instructions stored in memory for calculating the proportional payment to each contributor based on the weighing and an income from the collaborative work. The processing system 110 and/or the system 200 may be adapted to determine the weighting and proportional payment for the contribution item using any of the above-described methods and/or calculations, either alone or in any combination.

The proportional payment may be calculated based on a product of the weighting and the income from the collaborative work. A judge rating for each contribution item may be received, each judge rating provided by a judge via a second computing device. The weighting may be based on the judge rating of the contribution item divided by the judge rating of the collaborative work. The weighting may also be based on a combination of the judge rating and number of views.

The income may be one or more of subscription income, license fees, and pay-per-view fees. The income may also be advertising income. The collaborative work may be monetized or otherwise generate revenue by charging a fee to advertisers for the rights to provide ads in conjunction with the presentation of the collaborative work.

Figure 4:
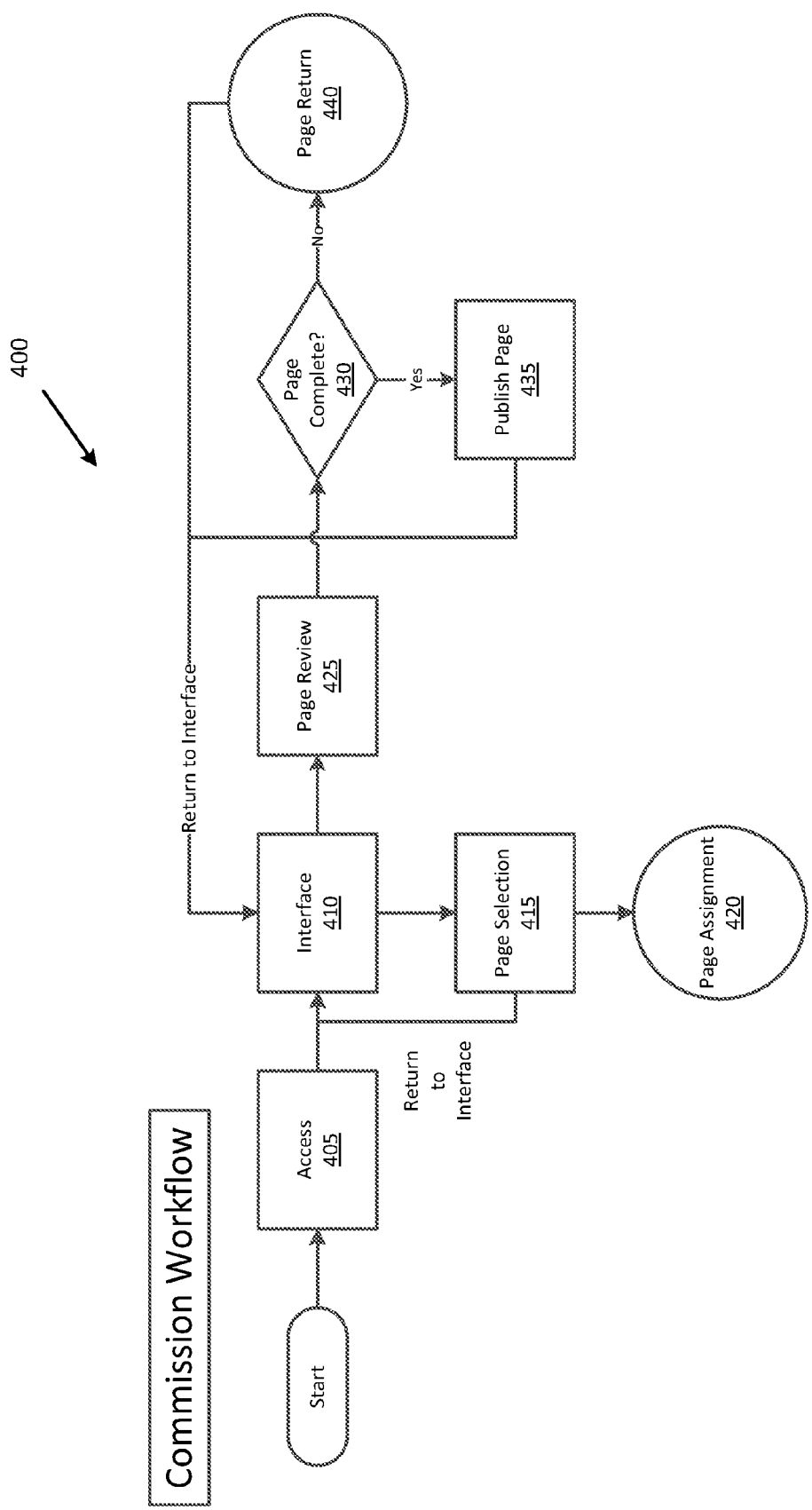
FIG. 4 is a block diagram illustrating an exemplary commissioner workflow.

FIG. 4 is a block diagram illustrating an exemplary commissioner workflow. The workflow 400 may be utilized by a commissioner using, for example, the processing system 110 and/or the system 200 to carry out or otherwise implement at least a portion of the system and method.

The workflow 400 may begin at step 405 wherein a commissioner accesses the system, e.g., the processing system 110 and/or the system 200. The commissioner may access the system by logging in to the system using a login identification and password. At step 410, the commissioner may be presented with a commissioner interface. In some embodiments, the commissioner interface may be a graphical or other user interface. Once at the commissioner interface, the commissioner may be presented with one or more of a list of pages (including one or more contribution items) that have been marked completed by judges and/or editors, a list of pages requiring assignment to judges and/or editors, etc. Using the interface at step 410, the commissioner may be provided with at least two options. At step 415, the commissioner may select a page. The page selection may be for a page that includes one or more contribution items requiring judging and/or editing to be assigned to a judge and/or editor. The page selection may be for assignment to a contributor so that the contributor may provide a contribution item. At step 420, the commissioner assigns the selected page to the contributor, editor, and/or judge, as appropriate. The commissioner may then be returned to step 410.

The commissioner may also select a page to review and review the page at step 425. The commissioner may act as an editor and/or judge for a contribution item. In those embodiments, the commissioner may, at step 425, review the contribution item provided by, or otherwise received from the contributor. The commissioner may review the page to correct for spelling and/or grammatical errors, accuracy of the information, relevancy of the information, etc. In other embodiments, the commissioner may review contribution items received, e.g., to serve as a quality control check on reviewed work, to review the content in light of the judge rating assigned thereto, or both. At step 430, the commissioner may indicate whether the page being reviewed is complete. If the page is complete at step 430, the page and/or contribution item may be published or otherwise made a part of the collaborative work at step 435. If the page and/or contribution item is not complete at step 430, e.g., the page requires further editing, an updated judge rating, etc.; the page completion may be unmarked and returned to the contributors, editors, and/or judges for additional work at step 440. The commissioner workflow 400 may further include a mechanism for the commissioner to log out of the system.

Figure 5:
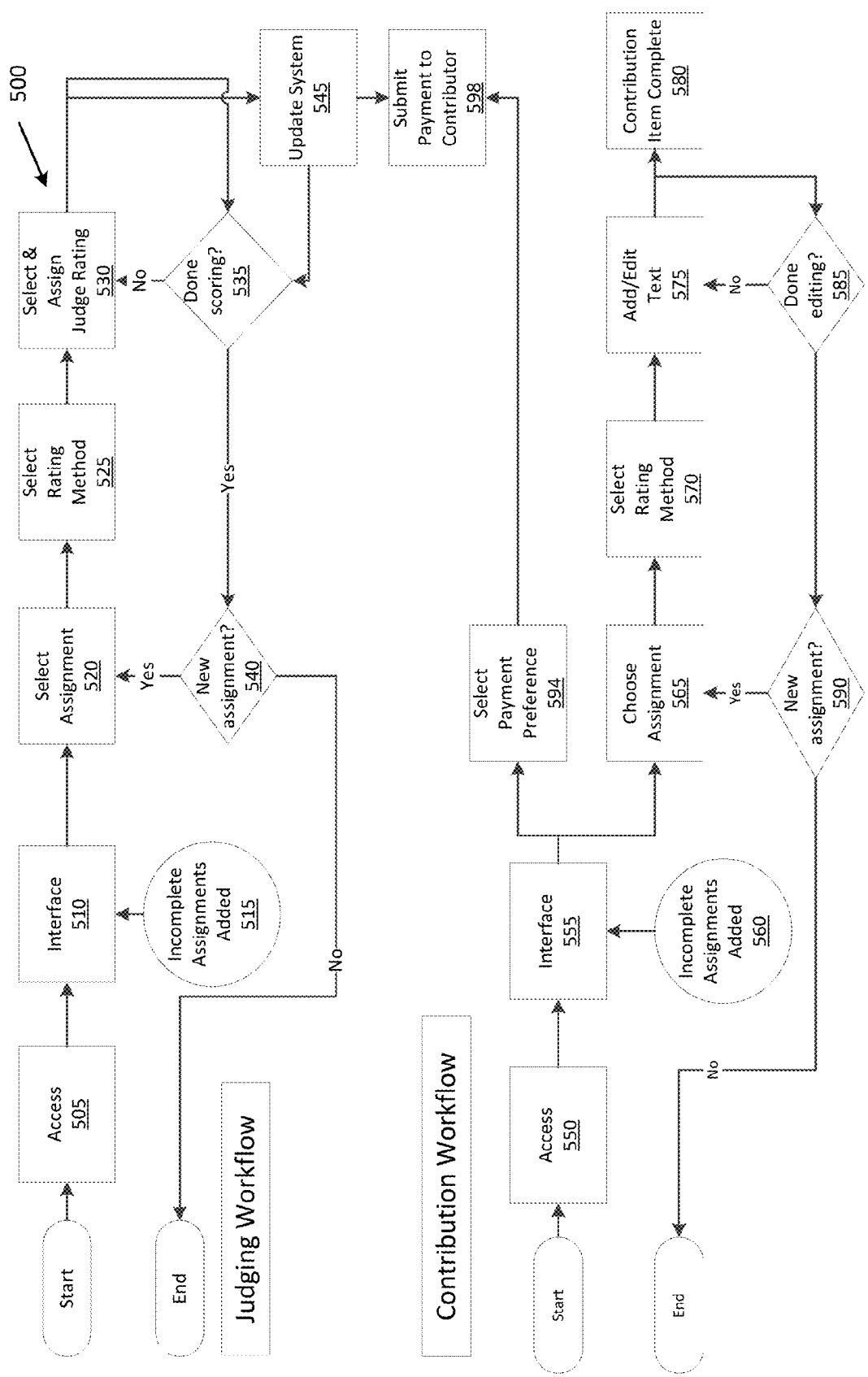
FIG. 5 is a diagram illustrating exemplary judging and contribution workflows.

FIG. 5 is a diagram illustrating exemplary judging and contribution workflow 500 according to various embodiments. The workflow 500 may be utilized by a judge and/or contributor using, for example, the processing system 110 and/or the system 200 to carry out or otherwise implement at least a portion of the system and method. With respect to the judging workflow, the judge may begin at step 505 where the judge accesses the system by, for example, logging in to the system. The judge may be presented with an interface at step 510, which may be a user interface listing assignments for the judge to judge and assign a judge rating to. Any pages previously marked as incomplete by the commissioner may be added to the assignment listing at step 515. From the interface at step 510, the judge may choose an assigned page to work on, e.g., to review and assign a judge rating to, at step 520. At step 525, the judge may select a methodology to be used to assign a judge rating to the assigned page/contribution item. Exemplary methods of assignment of the judge rating may include the judge color-coding text, possibly each word, sentence, or paragraph, based on a score category. For example, the judge may assign a judge rating of low, medium, or high based on standard deviations from the median page score. The judge may assign a number between 1 and 100 to the page/contribution item according to another example. Additional exemplary judge rating methodologies may include, but are not limited to, a thumbs-up/thumbs-down system, a star rating system, a slider, a commenting system and the like. At step 530, the judge may select text to be rated and assign the rating using any of the above-described judge rating methodologies. If the judge is finished judging/scoring the page/contribution item at step 535, the judge can determine if he/she would like to judge a new assignment at step 540. If so, the judge may return to the select assignment at step 520. Otherwise, the judge may end the judging workflow by, for example, logging out of the processing system 110.

At step 545, the judge has completed judging a page/contribution item and has returned the contribution item to the processing system. The processing system 110 may, using any of the herein described techniques, formulations and/or considerations, either alone or in combination, make necessary adjustments based on the contribution item reviewed by the judge and its assigned judge rating. For example, the system may return the page to the commissioner interface at step 410 discussed above, so as to be reviewed by the commissioner again. The system may further update such information as the total score for the collaborative work, derive a new median score for the collaborative work, determine new standard deviations for the collaborative work, updated color-coding for the collaborative work, etc.

With respect to the contributor's workflow, the contributor may begin at step 550 wherein the contributor accesses the system by, for example, logging in to the processing system 110 and/or the system 200. The contributor may be presented with an interface at step 555, which may be a user interface showing the contributor a list of available assignments, etc. Pages/contribution items previously marked as incomplete by the commissioner may be returned to the contributor's assignment list at step 560. From step 555, the contributor may select or choose an assignment to work on at step 565. At step 570, the contributor may select a rating method which may be similar to the rating method at step 525 discussed above. At step 575, the contributor may add or edit text to the page/contribution item. At step 580, the contributor may mark the assignment as complete, e.g., mark the assignment/contribution item as being ready for publishing. At step 585, the contributor may determine if he/she is done adding and/or editing text to the contribution item and, if not, return to add/edit text at step 575. If the contributor is done editing at step 585, he/she may determine if they would like to choose another assignment to work on at step 590 and, if not, end the contribution session. Returning to step 555, the contributor may also select payment preferences at step 594. At step 598, the contributor may be sent payment for their contribution items based on, for example, one or more of the judge rating assigned to their contribution items and the number of views of the contribution item. The contributor may be paid for their contribution items according to any of the herein described formulas, calculations, and/or considerations, either alone or in combinations thereof.

Figure 6:
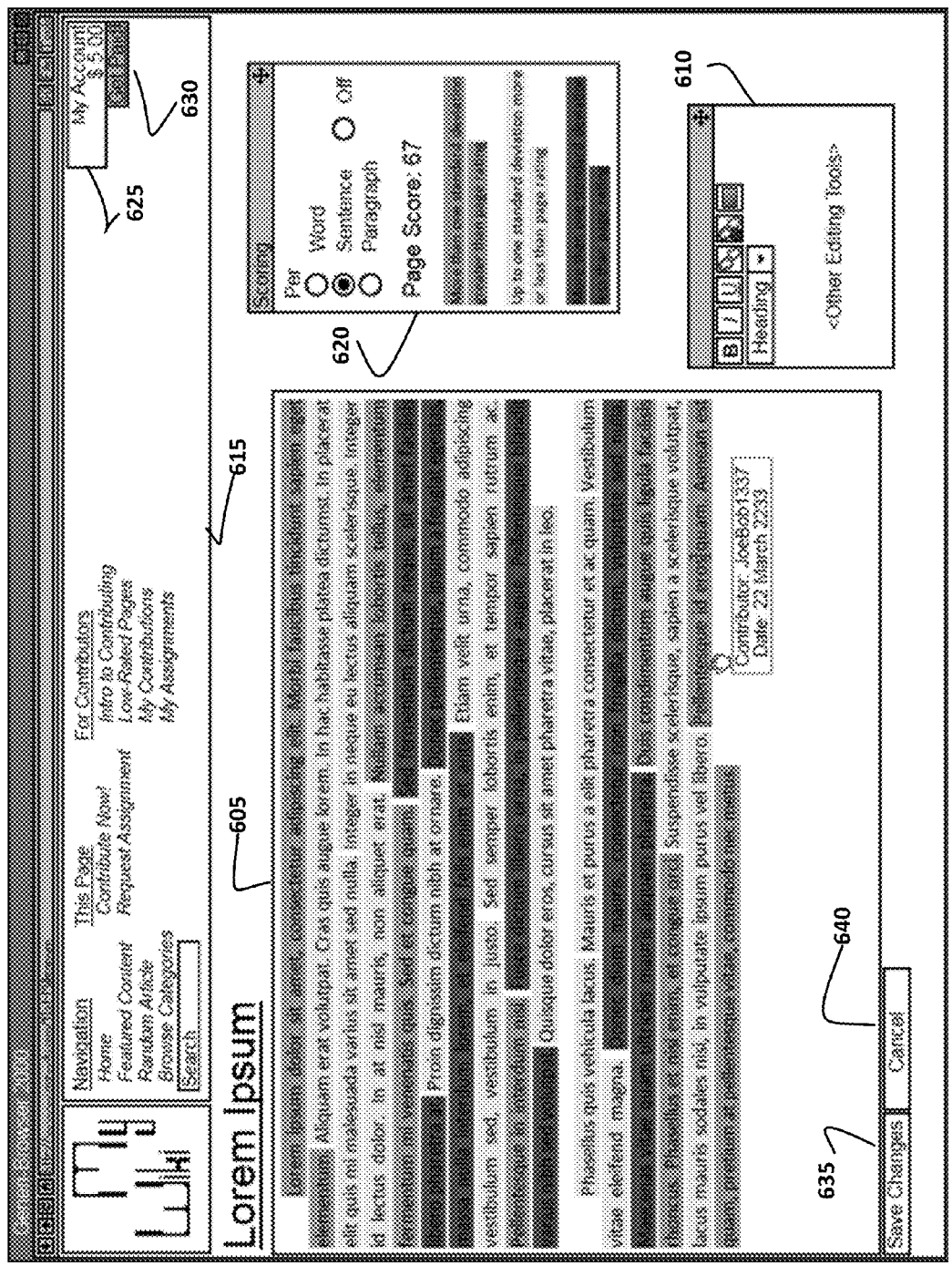
FIG. 6 is a screenshot of an exemplary contributor's editing page.

FIG. 6 is a screenshot of an exemplary contributor's editing page 600. That is, FIG. 6 may show one example of a web page provided by the processing system 110 to the contributors wherein the contributors can edit a contribution item. As discussed above, the processing system 110 may be implemented online wherein the commissioner, contributors, editors, and/or judges interface with the processing system 110 via a series of web pages. In another example, FIG. 6 may show a screen rendered by an application residing on, for example, a computing device 105, adapted to implement at least a portion of the present disclosure. The contributors editing page 600 may include a text box 605, an editing tools box 610, a menu box 615, and a scoring box 620. The text box 605 may generally be described as a portion of the screen wherein the contributor adds and/or edits text, e.g., a contribution item. In one embodiment, the text being shown in the text box 605 may be color coded or otherwise differentiated according to a page score, i.e., to indicate the deviation of the text from the page score. The editing tools box 610 may be a portion of the screen wherein the contributor selects formatting tools to be used on the text included in the text box 605. Exemplary editing tools available for the contributor include bold, italic, underline, etc., which are well known in the art. The menu box 615 may include contributor selectable icons and the like wherein the contributor can interface with the system, e.g., the processing system 110. Exemplary icons that may be provided to the contributor in the menu box 615 are illustrated in FIG. 6. Various aspects may further provide for an account box 625 showing the amount of payment the contributor has earned and a payment icon 630 configured to permit the contributor to be paid.

The scoring box 620 may include an interface and/or legend that may be contributor selectable (i.e., turned on or off by the contributor) or predetermined by the system and which illustrates the page score for the text illustrated in the text box 605. The page score may be contributor selectable so as to render the word, the sentence, or the paragraph, color coded to reflect its standard deviation from the page score. The name of the contributor providing a contribution item, as well as the date/time the contribution item was provided, may be automatically displayed to the contributor in response to a mouse hovering over the contribution item. That is, any word contributed by the same contributor at the same time may be grouped with brackets when moused over. The contributors editing page 600 may further include a save changes button 635 configured to save the changes the contributor has made to the text shown in the text box 605 and a cancel button 640 which permits the contributor to cancel the changes made to the text, i.e., to back out of any changes.

Figure 7:
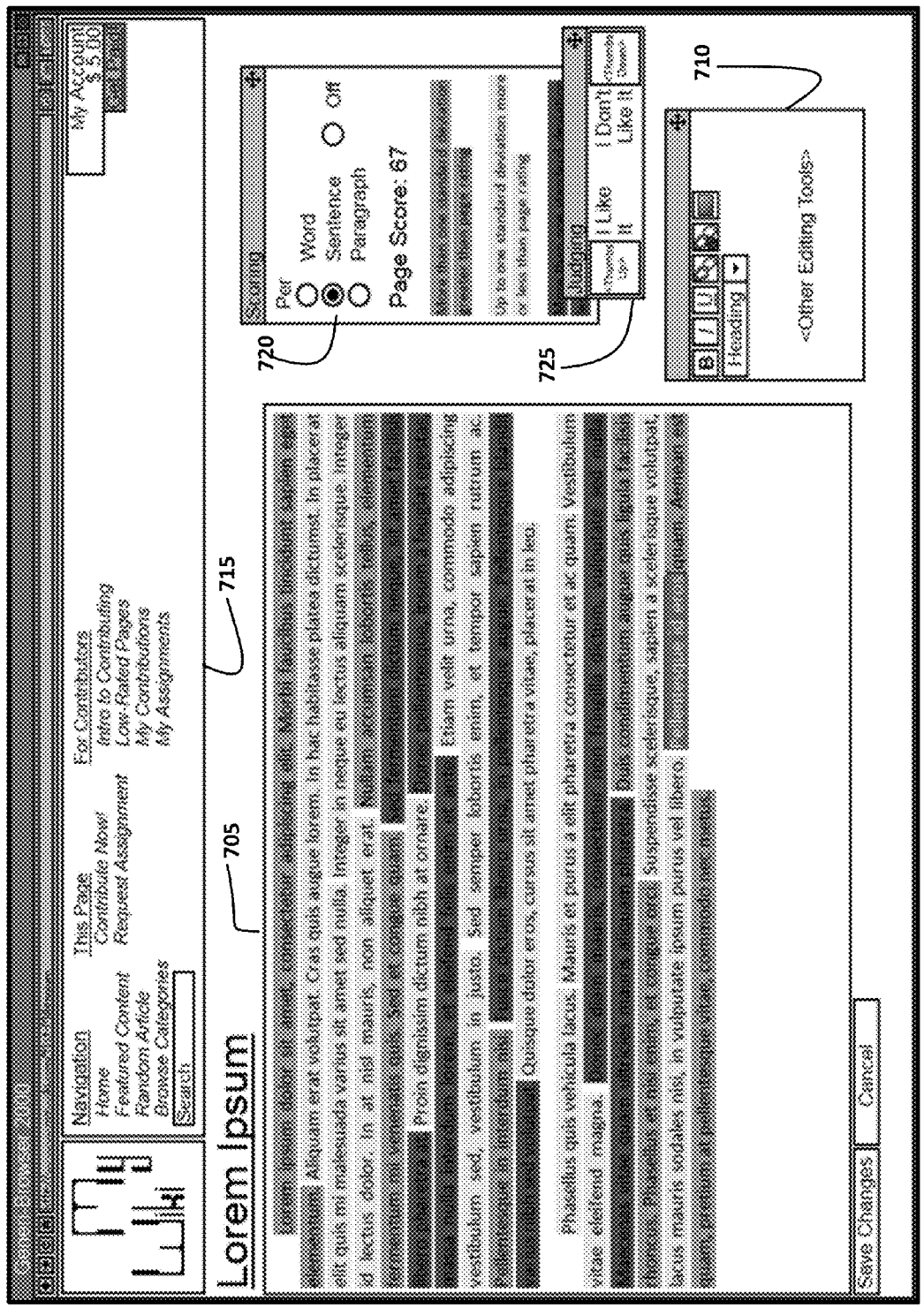
FIG. 7 is a screenshot of an exemplary judging page.

Referring now to FIG. 7, shown therein is a screenshot of an exemplary judging page 700, in accordance with the present disclosure. Generally, the judging page 700 is similar to the contributor's page 600 discussed above. That is, the judging page 700 may include a text box 705, an editing tools box 710, a menu box 715, and a scoring box 720, each of which may operate and/or function as is described above. In some embodiments, the judging page 700 may further include a judging box 725 which permits the judge to assign a judge rating. In the illustration shown in FIG. 7, the judging box 725 may be implemented as a thumbs-up or thumbs-down, judge selectable buttons corresponding to whether or not the judge likes the selected text. However, as is described herein, the judge rating may further be implemented as a number between 1 to 100, a slider, etc. In operation, the judge may select the text, e.g., a contribution item, to be judged and then use the judging box to indicate his/her judge rating of the selected text. The present technology may then adjust the value, weight, etc., of the selected text based on the judge rating. In some embodiments, the judge rating for a contribution item may be determined based on a panel of judges reviewing the contribution item and assigning judge ratings, e.g., the judge rating assigned to the contribution item may be the average of the judge ratings assigned by the panel of judges.

According to some embodiments, an e-reader and the like may be used for at least part of the measuring of a contribution item's value or weighting. For example, the e-reader may be used for tracking the number of views of the contribution item, for determining the determining or receiving the judge ratings of the item, and for other components of a formula for measuring the contribution item's value and the corresponding payment.

According to various embodiments, Digital Rights Management (DRM) or other copy protection schemes to protect the finished and published collaborative work may be provided. For example, viewing or copying of the collaborative work may be selectively restricted such that the work could be viewed only on an e-reader/web browser and not copied to any external device without a license. The collaborative work may also be restricted such that copy/paste functionality is available only through use of the system and methods described herein, and otherwise disabled. This restriction is designed to encourage use of the system and method where a contributor may be fairly given appropriate credit and payment (e.g., microroyalties) for enhancements they provided to the work. Various embodiments would provide adequate ability to make copies and add enhancements under appropriate rules to protect the intellectual property rights of the previous authors of the collaborative work, yet also allowing new contributors to add their improvements and be compensated accordingly for them.

Figure 8:
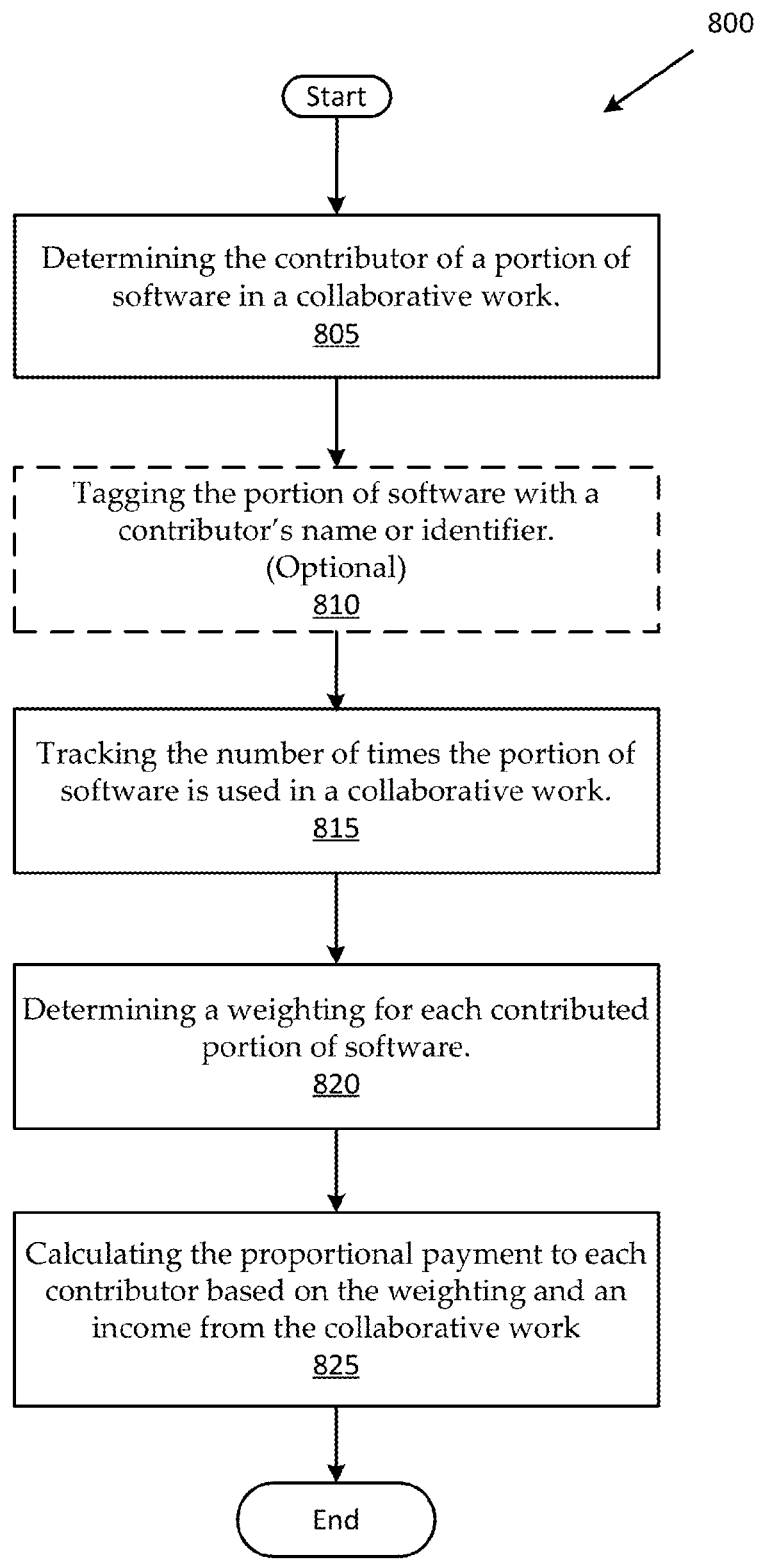
FIG. 8 is an exemplary flow diagram of a method for determining payment to contributor.

FIG. 8 is another exemplary flow diagram of a method 800 for determining a payment to a contributor. The payment may be a microroyalty or proportional payment. The method 800 may be performed by the processing system 110 and/or the system 200 as described above in FIG. 3. In various embodiments, the steps of method 800 as described below may be stored as instructions in memory for execution by a processor in the processing system 110 and/or the system 200.

The method 800 may include the step 805 of determining the contributor of a portion of software (i.e., code) in a collaborative work. The determination may be performed on any software, open source, proprietary, interpreted code, pseudo code, etc. In one embodiment, a compiled program may be traced back from the binary to the original source, such as through the use of a decompiler. Optionally, interpreted code or pseudo code may be parsed to determine the contributor. In another embodiment, comments accompanying the source code may be used to determine the contributor.

In one embodiment, the determination may be performed automatically by the processing system 110 and/or by the system 200. For example, through an application module. Such an application module may determine a contributor through the examples as described above. Optionally, or in addition to the previous determinations, the module may query a database or library of code to find a contributor.

The method 800 may include an optional step 810 of tagging the portion of software in a collaborative work with the contributor's name. Optionally, a contributor may have an identifier, such as an account number or other form of identification which may be used in place of a name. The tagging may facilitate remuneration for use of the contributor's intellectual property. The tagging may be accomplished through the insertion of comments in the source code, the addition of metadata, or other similar methods. In one embodiment, the tagging may be performed automatically by the processing system 110 and/or the system 200, for instance the tagging may be performed through an application module, such as a tagging module.

The method 800 may further include the step 815 for tracking the number of times a portion of software is used or written in a collaborative work. Such tracking may be performed by a compiler which indicates the number of occurrences of the portion of software in generating an executable. Optionally, the number of occurrences may include the number of function calls or references to a file. In another embodiment, the compiler may partially assist in tracking the number of actual uses of a portion of software, by building in to the generated executable a reporting of the uses when the executable is run. The reporting may be provided to a computing system, such as a website server, or to the judges who may determine the weighting. Optionally, the reporting may be used in the subsequent steps for determining a weighting and calculating proportional payment as described below.

The method 800 may include the step 820 for determining a weighting for each contributed portion of software. In various embodiments, the weighting may be determined as described above in FIG. 3. Some embodiments may track the number of occurrences of the portion of software or the actual number of times the portion of software is used when the collaborative work or program is executed. The weighting may then be based, at least in part, on the number of occurrences or actual uses. In various embodiments, the weighing may be based, at least in part, on sequences of code, essentiality, or other similar criteria. Optionally, the weighting may be done without the input of judges.

The method 800 may include the step 825 for calculating proportional payment to each contributor based, at least in part, on the weighting or an income from the collaborative work. The income may be as described above. Optionally, the market value of the collaborative work may comprise the income or be used, at least in part, in calculating proportional payment. The processing system 110 and/or the system 200 may be adapted to determine the weighting and proportional payment for the contribution item using any of the above-described methods and/or calculations, either alone or in any contribution. Optionally, the proportional payment may be calculated using ratio of the number of executions of the portion of software, such as the number of times a processor executes the portion, divided by the number of uses of the entire software or collaborative work.

While the method in FIG. 8 is envisioned to assist remunerations or microroyalties for the intellectual property holders in open source software, it may be applied to any software code or any other creative work as described above. In various embodiments, a central website or server may keep an accounting of the microroyalties resulting from the methods described above. Payment may be given to the contributors on a fixed time basis (e.g., monthly), continually as proportional payments are calculated, held upon request, or other similar methods.

It is noteworthy that any hardware platform suitable for performing the processing described herein is suitable for use with the technology. The terms "computer-readable storage medium" and "computer-readable storage media" as used herein refer to any medium or media that participate in providing instructions to a CPU for execution. Such media can take many forms, including, but not limited to, non-volatile media, volatile media and transmission media. Non-volatile media include, for example, optical or magnetic disks, such as a fixed disk. Volatile media include dynamic memory, such as system RAM. Transmission media include coaxial cables, copper wire and fiber optics, among others, including the wires that comprise one embodiment of a bus. Transmission media can also take the form of acoustic or light waves, such as those generated during radio frequency (RF) and infrared (IR) data communications. Common forms of computer-readable media include, for example, a floppy disk, a flexible disk, a hard disk, magnetic tape, any other magnetic medium, a CD-ROM disk, digital video disk (DVD), any other optical medium, any other physical medium with patterns of marks or holes, a RAM, a PROM, an EPROM, an EEPROM, a FLASHEPROM, any other memory chip or data exchange adapter, a carrier wave, or any other medium from which a computer can read.

Various forms of computer-readable media may be involved in carrying one or more sequences of one or more instructions to a CPU for execution. A bus carries the data to system RAM, from which a CPU retrieves and executes the instructions. The instructions received by system RAM can optionally be stored on a fixed disk either before or after execution by a CPU. The above description is illustrative and not restrictive. Many variations of the technology will become apparent to those of skill in the art upon review of this disclosure. The scope of the technology should, therefore, be determined not with reference to the above description, but instead should be determined with reference to the appended claims along with their full scope of equivalents.

Some of the functions described herein may be composed of instructions that are stored on storage media (e.g., computer-readable medium). The instructions may be retrieved and executed by the processor. Some examples of storage media are memory devices, tapes, disks, and the like. The instructions are operational when executed by the processor to direct the processor to operate in accord with the invention. Those skilled in the art are familiar with instructions, processor(s), and storage media.

An exemplary computing system may be used to implement various embodiments of the systems and methods disclosed herein. The computing system may include one or more processors and memory. The memory may include a computer-readable storage medium. Common forms of computer-readable storage media include, for example, a floppy disk, a flexible disk, a hard disk, magnetic tape, any other magnetic medium, a CD-ROM disk, DVD, various forms of volatile memory, non-volatile memory that can be electrically erased and rewritten. Examples of such non-volatile memory include NAND flash and NOR flash and any other optical medium, the memory is described in the context of. The memory can also comprise various other memory technologies as they become available in the future.

Main memory stores, in part, instructions and data for execution by a processor to cause the computing system to control the operation of the various elements in the systems described herein to provide the functionality of certain embodiments. Main memory may include a number of memories including a main random access memory (RAM) for storage of instructions and data during program execution and a read only memory (ROM) in which fixed instructions are stored. Main memory may store executable code when in operation. The system further may include a mass storage device, portable storage medium drive(s), output devices, user input devices, a graphics display, and peripheral devices. The components may be coupled via a single bus. Alternatively, the components may be coupled via multiple buses. The components may be coupled through one or more data transport means. Processor unit and main memory may be coupled via a local microprocessor bus, and the mass storage device, peripheral device(s), portable storage device, and display system may be coupled via one or more input/output (I/O) buses.

Mass storage device, which may be implemented with a magnetic disk drive or an optical disk drive, may be a non-volatile storage device for storing data and instructions for use by the processor unit. Mass storage device may store the system software for implementing various embodiments of the disclosed systems and methods for purposes of loading that software into the main memory. Portable storage devices may operate in conjunction with a portable non-volatile storage medium, such as a floppy disk, compact disk or DVD, to input and output data and code to and from the computing system. The system software for implementing various embodiments of the systems and methods disclosed herein may be stored on such a portable medium and input to the computing system via the portable storage device.

Input devices may provide a portion of a user interface. Input devices may include an alpha-numeric keypad, such as a keyboard, for inputting alpha-numeric and other information, or a pointing device, such as a mouse, a trackball, stylus, or cursor direction keys. In general, the term input device is intended to include all possible types of devices and ways to input information into the computing system. Additionally, the system may include output devices. Suitable output devices include speakers, printers, network interfaces, and monitors. Display system may include a liquid crystal display (LCD) or other suitable display device. Display system may receive textual and graphical information, and processes the information for output to the display device. In general, use of the term output device is intended to include all possible types of devices and ways to output information from the computing system to the user or to another machine or computing system.

Peripherals may include any type of computer support device to add additional functionality to the computing system. Peripheral device(s) may include a modem or a router or other type of component to provide an interface to a communication network. The communication network may comprise many interconnected computing systems and communication links. The communication links may be wireline links, optical links, wireless links, or any other mechanisms for communication of information. The components contained in the computing system may be those typically found in computing systems that may be suitable for use with embodiments of the systems and methods disclosed herein and are intended to represent a broad category of such computing components that are well known in the art. Thus, the computing system may be a personal computer, hand held computing device, telephone, mobile computing device, workstation, server, minicomputer, mainframe computer, or any other computing device. The computer may also include different bus configurations, networked platforms, multi-processor platforms, etc.

Various operating systems may be used including Unix, Linux, Windows, Macintosh OS, Palm OS, and other suitable operating systems. Due to the ever changing nature of computers and networks, the description of the computing system is intended only as a specific example for purposes of describing embodiments. Many other configurations of the computing system are possible having more or fewer components.

It is noteworthy that various modules and engines may be located in different places in various embodiments. Modules and engines mentioned herein can be stored as software, firmware, hardware, as a combination, or in various other ways. It is contemplated that various modules and engines can be removed or included in other suitable locations besides those locations specifically disclosed herein. In various embodiments, additional modules and engines can be included in the exemplary embodiments described herein.

The foregoing detailed description of the technology herein has been presented for purposes of illustration and description. It is not intended to be exhaustive or to limit the technology to the precise form disclosed. Many modifications and variations are possible in light of the above teaching. For example, software modules and engines discussed herein may be combined, expanded into multiple modules and engines, communicate with any other software module(s) and engine(s), and otherwise may be implemented in other configurations. The described embodiments were chosen in order to best explain the principles of the technology and its practical application to thereby enable others skilled in the art to best utilize the technology in various embodiments and with various modifications as are suited to the particular use contemplated. It is intended that the scope of the technology be defined by the claims appended hereto.

What is claimed is:

1. A non-transitory computer readable storage medium having a compiler program embodied thereon, the compiler program executable by a processor in a computing device to perform a method for determining a proportional payment to each contributor of software in source code of a collaborative work, the software comprising a plurality of contributed portions, the method executed by the compiler program comprising:
   compiling the source code into an executable code using the compiler program;
   determining for each contributor one or more portions of software in the executable code contributed by the contributor using the compiler program;
   tracking a number of times each contributed portion of software is executed in the executable code using the compiler program;
   determining a weighting for each contributed portion of software, the weighting based at least in part on the number of times each contributed portion of software is executed in the executable code tracked by the compiler program; and
   calculating the proportional payment to each contributor based at least in part on the weighting, using the compiler program.

2. The non-transitory computer readable storage medium of claim 1, wherein the method further comprises tagging each contributed portion of software in the executable code of the collaborative work with a contributor's name or identifier.

3. The non-transitory computer readable storage medium of claim 1, wherein the proportional payment is calculated based on a product of the weighting and an income from the collaborative work.

4. The non-transitory computer readable storage medium of claim 3, wherein the weighting is further based on a judge rating of the contributed portion of software provided by a judge in relation to a judge rating of the collaborative work.

5. The non-transitory computer readable storage medium of claim 4, wherein the method further comprises calculating the proportional payment to a judge for each reviewed portion of software.

6. The non-transitory computer readable storage medium of claim 3, wherein the income is one or more of subscription income, advertising income, license fees, and pay-per-view fees.

7. The non-transitory computer readable storage medium of claim 3, wherein the income comprises a market value of the collaborative work.

8. The non-transitory computer readable storage medium of claim 1, the tracking further comprising collecting, in a database, a number of executions of the collaborative work and the number of executions of each portion of software therein, wherein the weighting for each contributed portion of software is further based on the number of executions of the contributed portion of software in relation to the number of executions of the collaborative work.

9. The non-transitory computer readable storage medium of claim 1, wherein the method further comprises receiving from a commissioner a selection of at least a portion of the collaborative work to assign to a judge for rating.

10. The non-transitory computer readable storage medium of claim 9, wherein the method further comprises receiving from an editor one or more of a determination of which portion of software to retain in the collaborative work or revisions to one or more portions of software, wherein the revisions are performed before a judge rates the portions of software.

11. The non-transitory computer readable storage medium of claim 1, wherein the compiler is further in communication with a server that tracks an accounting of the proportional payment to each contributor.

12. A system comprising:
   a memory for storing executable instructions including a compiler configured for compiling source code of a collaborative work written by a plurality of contributors, each of the contributors having contributed a portion of software to the source code, the compiler further configured for determining a proportional payment to each contributor of the collaborative work;
   a processor configured to execute the compiler to perform a method, the method comprising:
      compiling the source code into an executable code;
      determining for each contributor the contributed portion of software in the source code;
      tracking a number of times the contributed portion of software is executed in compiling the source code;
      determining a weighting for the contributed portion of software, the weighting based at least in part on the tracked number of times the contributed portion of software is executed in compiling the source code; and
      calculating the proportional payment for the contributor based on the weighting.

13. The system of claim 12, wherein the compiler is further configured for tagging the portion of software in the collaborative work with a name or an identifier of the contributor of the portion of software.

14. The system of claim 12, wherein the executable instructions further include program code executable by the processor to perform a method comprising:
   determining an income of the contributed portion of software and an income of the collaborative work; and
   calculating the proportional payment based on a product of the weighting and the income from the collaborative work.

15. The system of claim 14, wherein the weighting is further based on a judge rating of the contributed portion provided by a judge, in relation to a judge rating of the collaborative work.

16. The system of claim 14, wherein the income of the collaborative work is one or more of subscription income, advertising income, license fees, and pay-per-view fees.

17. The system of claim 14, wherein the income of the collaborative work comprises a market value of the collaborative work.

18. The system of claim 12, the tracking further comprising collecting, in a database, a number of executions of the collaborative work and the number of executions of each portion of software therein, wherein the weighting is further based on the number of executions of the contributed portion in relation to the number of executions of the collaborative work.

19. The system of claim 12, wherein the compiler is further configured to generate code in the executable code for the tracking a number of times a contributed portion of software is actually executed when the executable code is run.

20. A non-transitory computer readable storage medium having a decompiler program embodied thereon, the decompiler program executable by a processor in a computing device to perform a method for determining a proportional payment to each contributor of a portion of software in source code that has been compiled into a collaborative work, the method executed by the decompiler program comprising:

decompiling the collaborative work to determine a contributor of a portion of software in the collaborative work;

tracking, from decompiling the collaborative work, a number of times the contributed portion of software is executed in the collaborative work;

determining, from decompiling the collaborative work, a weighting for the contributed portion of software, the weighting based on the tracked number of times the contributed portion of software is executed in the collaborative work; and calculating the proportional payment to each contributor based on the weighting and an income from the collaborative work.

* * * * *